United States Patent [19]

Groebke

[11] 4,042,580
[45] Aug. 16, 1977

[54] PHENYLAZOPHENYL DYES HAVING AN ALKOXYACYLAMINO GROUP ON THE COUPLING COMPONENT RADICAL

[75] Inventor: Wolfgang Groebke, Oberwil, Basel-Land, Switzerland

[73] Assignee: Sandoz Ltd., Basel, Switzerland

[21] Appl. No.: 554,547

[22] Filed: Mar. 3, 1975

Related U.S. Application Data

[63] Continuation of Ser. No. 337,273, March 1, 1973, abandoned, which is a continuation-in-part of Ser. No. 138,813, April 29, 1971, abandoned.

[30] Foreign Application Priority Data

May 6, 1970  Switzerland .................. 6808/70
Dec. 29, 1970  Switzerland .................. 19249/70

[51] Int. Cl.² .............. C09B 29/08; C09B 43/18; C09B 29/26
[52] U.S. Cl. ................ 260/207; 260/205; 260/206; 260/207.1; 260/207.5
[58] Field of Search ........... 260/205, 206, 207, 207.1, 260/207.3, 207.5

[56] References Cited

U.S. PATENT DOCUMENTS

| | | | |
|---|---|---|---|
| 3,268,507 | 8/1966 | Kruckenberg | 260/207 |
| 3,342,804 | 9/1962 | Mueller | 260/205 X |
| 3,359,256 | 12/1967 | Mueller et al. | 260/207.1 X |
| 3,398,135 | 8/1968 | Mueller | 260/205 |
| 3,398,137 | 8/1968 | Mueller | 260/207 |
| 3,428,622 | 2/1969 | Altermatt et al. | 260/206 |
| 3,652,534 | 3/1972 | Wegmuller | 260/207.1 X |

FOREIGN PATENT DOCUMENTS

| | | | |
|---|---|---|---|
| 766,772 | 6/1971 | Belgium | 260/207.1 |
| 1,928,372 | 2/1970 | Germany | 260/207.1 |

*Primary Examiner*—Charles F. Warren
*Attorney, Agent, or Firm*—Gerald D. Sharkin; Richard E. Vila; Melvin M. Kassenoff

[57] ABSTRACT

Compounds of the formula

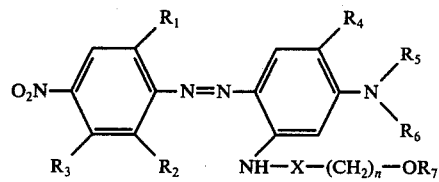

wherein
 $R_1$ is chloro, bromo, cyano, nitro, alkylsulfonyl, substituted alkylsulfonyl, phenylsulfonyl or substituted phenylsulfonyl,
 $R_2$ is hydrogen, chloro or bromo,
 $R_3$ is hydrogen, chloro, bromo or acylamino, with the proviso that at least one of $R_2$ and $R_3$ is hydrogen,
 $R_4$ is hydrogen, alkyl, substituted alkyl, alkoxy or substituted alkoxy,
 each of $R_5$ and $R_6$ is independently alkyl or substituted alkyl, wherein each substituent of substituted alkyl is independently chloro, bromo, cyano, hydroxy, alkoxy, chloroalkoxy, bromoalkoxy, cyanoalkoxy, formyloxy, alkylcarbonyloxy, substituted alkylcarbonyloxy, benzoyloxy, substituted benzoyloxy, alkoxycarbonyl, substituted alkoxycarbonyl, phenoxycarbonyl, substituted phenoxycarbonyl, alkoxycarbonyloxy, substituted alkoxycarbonyloxy, phenoxycarbonyloxy or substituted phenoxycarbonyloxy,
 $R_7$ is alkyl or substituted alkyl,
 X is —CO—, —CO$_2$— or —SO$_2$—, and n is 2, 3 or 4.

These compounds are highly suitable for use as disperse dyes. As such they are employed for dyeing high molecular weight synthetic and regenerated organic fibers, either in loose form, as yarn or in the various textile forms. The dyes are of high tinctorial strength, have good affinity, are resistant to sublimation, and give dyeings of notably good light and wet fastness.

19 Claims, No Drawings

PHENYLAZOPHENYL DYES HAVING AN ALKOXYACYLAMINO GROUP ON THE COUPLING COMPONENT RADICAL

This application is a continuation of application Ser. No. 337,273, filed Mar. 1, 1973 and now abandoned, which, in turn, is a continuation-in-part of application Ser. No. 138,813, filed Apr. 29, 1971 and now abandoned.

This invention relates to compounds of Formula I which are highly suitable for use as disperse dyes. As such they are employed for dyeing high molecular weight synthetic and regenerated organic fibers, either in loose form, as yarn or in the various textile forms. The dyes are of high tinctorial strength, have good affinity, are resistant to sublimation, and give dyeings of notably good light and wet fastness.

These new dyes have the formula

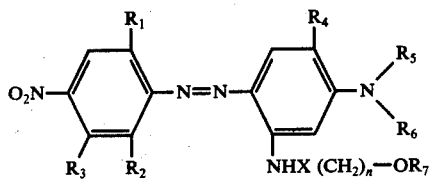

wherein
$R_1$ is chloro, bromo, cyano, nitro, alkylsulfonyl, substituted alkylsulfonyl, phenylsulfonyl or substituted phenylsulfonyl.
$R_2$ is hydrogen, chloro or bromo,
$R_3$ is hydrogen, chloro, bromo or acylamino, with the proviso that at least one of $R_2$ and $R_3$ is hydrogen,
$R_4$ is hydrogen, alkyl, substituted alkyl, alkoxy or substituted alkoxy,
each of $R_5$ and $R_6$ is independently alkyl or substituted alkyl, wherein each substituent of substituted alkyl is independently chloro, bromo, cyano, hydroxy, alkoxy, chloroalkoxy, bromoalkoxy, cyanoalkoxy, formyloxy, alkylcarbonyloxy, substituted alkylcarbonyloxy, benzoyloxy, substituted benzoyloxy, alkoxycarbonyl, substituted alkoxycarbonyl, phenoxycarbonyl, substituted phenoxycarbonyl, alkoxycarbonyloxy, substituted alkoxycarbonyloxy, phenoxycarbonyloxy or substituted phenoxycarbonyloxy,
$R_7$ is alkyl or substituted alkyl,
$X$ is $-CO-$, $-CO_2-$ or $-SO_2-$, and $n$ is 2, 3 or 4.

Each alkyl and alkoxy radical, including the alkyl chain of substituted alkyl, the alkoxy chain of substituted alkoxy, the alkyl radical of alkylcarbonyloxy, the alkoxy radical of alkoxycarbonyl, etc., contains 1 to 4 carbon atoms. The substituents of substituted alkyl and substituted alkoxy, except as otherwise defined, are halo, notably chloro and bromo, hydroxy, cyano and alkoxy. The substituents of the substituted phenyl radicals, including substituted benzoyloxy, phenoxycarbonyl, etc., are chloro, bromo, cyano, nitro, acyl, alkyl and alkoxy.

The preferred acyl groups are R—Y— and R'—Z—, wherein
R is a hydrocarbyl radical which may contain the above-mentioned substituents and/or hetero atoms, preferably an alkyl or phenyl radical,
y is $-O-CO-$ or $-SO_2-$
R' is hydrogen or R, and
Z is $-CO-$, $-NR'-CO-$ or $-NR'-SO_2-$. Compounds of Formula I
wherein
$R_1$ is chloro, bromo, cyano, nitro, unsubstituted or substituted alkylsulfonyl or phenylsulfonyl,
$R_2$ is hydrogen, chloro or bromo,
$R_3$ is hydrogen, chloro, bromo or acylamino, with the proviso that at least one of $R_2$ and $R_3$ is hydrogen,
$R_4$ is hydrogen or unsubstituted or substituted alkyl or alkoxy,
each of $R_5$ and $R_6$ is independently alkyl or alkyl substituted by chloro, bromo, cyano, hydroxy, alkoxy, chloroalkoxy, bromoalkoxy, cyanoalkoxy, unsubstituted or substituted alkylcarbonyloxy, benzoyloxy, alkoxycarbonyl, phenoxycarbonyl, alkoxycarbonyloxy or phenocarbonyloxy,
$R_7$ is alkyl or substituted alkyl,
$X$ is $-CO-$, $-CO_2-$ or $-SO_2-$, and
$n$ is 2, 3 or 4,
wherein each alkyl and alkoxy radical has 1 to 4 carbon atoms,
each substituent of a substituted alkyl or alkoxy radical is halo (notably chloro or bromo), hydroxy or cyano,
each substituent of a substituted phenyl group (including the phenyl nucleus of benzoyl, phenoxycarbonyl, etc. radicals) is chloro, bromo, cyano, nitro, acyl, alkyl or alkoxy, and each acyl radical is as defined above are of interest.

The compounds of Formula I are produced by diazotizing an aniline of the formula

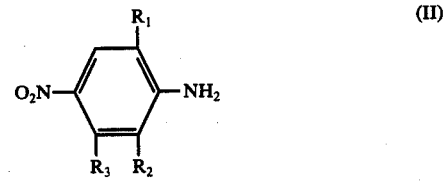

and coupling the resulting diazonium compound with a compound of the formula

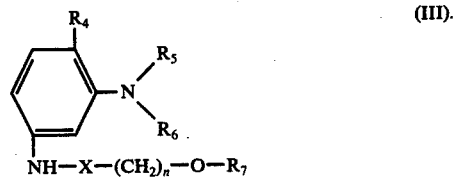

The compounds of Formula I which have the specific formula

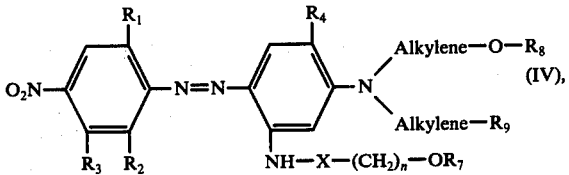

where
$R_8$ represents alkylcarbonyl, alkoxycarbonyl, benzoyl or phenoxycarbonyl, and
$R_9$ cyano, alkoxycarbonyl, phenoxycarbonyl, alkylcarbonyloxy, alkoxycarbonyloxy, benzoyloxy or phenoxycarbonyloxy, can be produced by acylation of an azo compound of the formula

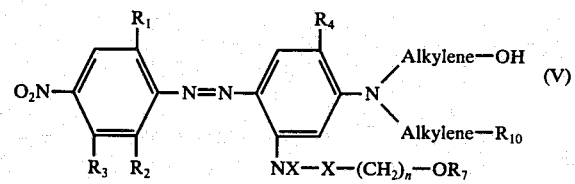

wherein $R_{10}$ is alkoxycarbonyl, phenoxycarbonyl, cyano or hydroxy,
with an acid of the formula $$R_8 - OH \qquad (VI),$$

wherein $R_8$ is alkylcarbonyl, alkoxycarbonyl, benzoyl or phenoxycarbonyl, or with a functional derivative of such an acid. Suitable functional derivatives are, for example, the anhydrides and halides, in particular the chlorides of these acids.

The diazotizing and coupling reactions are carried out in accordance with the standard methods that have been known for over a century.

The coupling components of Formula III are produced by known methods, e.g., by reaction of an amine of the formula

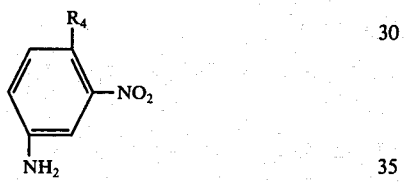

with an acid of the formula $HOOC(CH_2)_n-O-R_7$ at a temperature in the range of about 150° C. to 200° C. with cleavage of water, followed by reduction of the nitro group and introduction of the radicals $R_5$ and $R_6$ either by condensation or addition.

Preferred compounds of Formula I have the formula

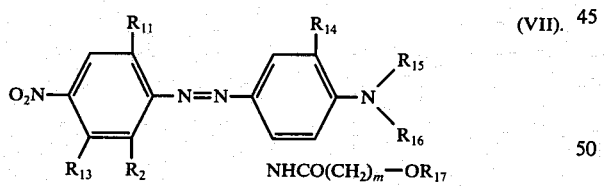

wherein
$R_2$ is hydrogen, chloro or bromo,
$R_{11}$ is chloro, bromo, cyano, nitro, methylsulfonyl, phenylsulfonyl or tolylsulfonyl,
$R_{13}$ is hydrogen, chloro, bromo, alkylcarbonylamino or substituted alkylcarbonylamino, wherein the alkyl radical of alkylcarbonylamino and substituted alkylcarbonylamino has 1 or 2 carbon atoms and the substituents of substituted alkylcarbonylamino are chloro or bromo, with the proviso that at least one of $R_2$ and $R_{13}$ is hydrogen,
$R_{14}$ is hydrogen, methoxy or ethoxy, each of $R_{15}$ and $R_{16}$ is independently alkyl of 1 to 4 carbon atoms or alkyl of 1 to 4 carbon atoms substituted by hydroxy, cyano, methoxy, ethoxy, acetoxy, propionyloxy, butyryloxy, benzoyloxy, methoxycarbonyl, ethoxycarbonyl, methoxycarbonyloxy or ethoxycarbonyloxy,
$R_{17}$ is methyl, ethyl or propyl, and m is 2 or 3,
and especially those compounds of Formula VII wherein
$R_{11}$ is cyano,
$R_{13}$ is hydrogen,
$R_{14}$ is hydrogen,
$R_{15}$ is ethyl,
$R_{16}$ is ethyl, and
$R_2$, $R_{17}$ and m are as defined above.

Also of interest are those compounds of Formula VII wherein
$R_{11}$ is cyano, nitro, phenylsulfonyl or tolylsulfonyl,
$R_{13}$ is hydrogen, alkylcarbonylamino or monosubstituted alkylcarbonylamino, wherein the alkyl radical of alkylcarbonylamino and monosubstituted alkylcarbonylamino has 1 or 2 carbon atoms and the substituent of monosubstituted alkylcarbonylamino is chloro or bromo, with the proviso that at least one of $R_2$ and $R_{13}$ is hydrogen.
each of $R_{15}$ and $R_{16}$ is independently alkyl of 1 to 4 carbon atoms or alkyl of 1 to 4 carbon atoms substituted by hydroxy, cyano, acetoxy, propionyloxy, methoxycarbonyl, ethoxycarbonyl, methoxycarbonyloxy or ethoxycarbonyloxy, and
$R_2$, $R_{14}$, $R_{17}$ and m are as defined following Formula VII, as well as those compounds of Formula VII wherein
$R_{11}$ is cyano, nitro, phenylsulfonyl or p-tolylsulfonyl,
$R_{13}$ is hydrogen, acetamido, β-chloropropionamido or β-bromopropionamido, with the proviso that at least one of $R_2$ and $R_{13}$ is hydrogen,
each of $R_{15}$ and $R_{16}$ is independently methyl, ethyl, propyl, butyl, β-hydroxyethyl, β-cyanoethyl, β-acetoxyethyl, β-propionyloxyethyl, β-methoxycarbonyloxyethyl, β-ethoxycarbonyloxyethyl, β-methoxycarbonylethyl or β-ethoxycarbonylethyl, and
$R_2$, $R_{14}$, $R_{17}$ and m are as defined following Formula VII.

Also preferred are the compounds of the formula

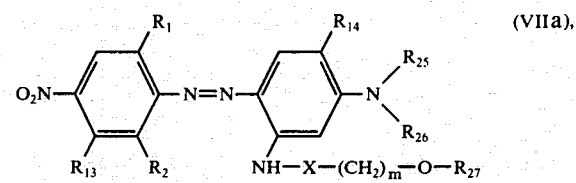

wherein $R_1$ is nitro, cyano, phenylsulfonyl or tolylsulfonyl,
$R_2$ is hydrogen, chloro or bromo,
$R_{13}$ is hydrogen, formamido, acetamido, propionamido, chloropropionamido or bromopropionamido, with the proviso that at least one of $R_2$ and $R_{13}$ is hydrogen,
$R_{14}$ is hydrogen, methoxy or ethoxy,
$R_{25}$ is alkyl, cyanoalkyl, formyloxyalkyl, alkylcarbonyloxyalkyl, alkoxycarbonyloxyalkyl or alkoxycarbonylalkyl,
$R_{26}$ is alkyl, hydroxyalkyl, formyloxyalkyl, alkylcarbonyloxyalkyl, alkoxycarbonyloxyalkyl or alkoxycarbonylalkyl,
$R_{27}$ is alkoxyalkyl,
X is $-CO-$, $-CO_2-$ or $-SO_2-$, and
m is 2 or 3,
wherein each alkyl, hydroxyalkyl and alkyl and alkoxy radical of each cyanoalkyl, formyloxyalkyl, alkylcarbonyloxyalkyl, alkoxycarbonyloxyalkyl, alkoxycarbonylalkyl and alkoxyalkyl independently has 1 to 4 carbon atoms.

Particularly preferred are compounds of the formula

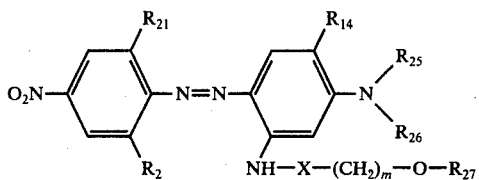

wherein
$R_2$ is hydrogen, chloro or bromo,
$R_{14}$ is hydrogen, methoxy or ethoxy,
$R_{21}$ is cyano, phenylsulfonyl or tolylsulfonyl,
$R_{25}$ is alkyl, cyanoalkyl, formyloxyalkyl, alkylcarbonyloxyalkyl, alkoxycarbonyloxyalkyl or alkoxycarbonylalkyl,
$R_{26}$ is alkyl, hydroxyalkyl, formyloxyalkyl, alkylcarbonyloxyalkyl, alkoxycarbonyloxyalkyl or alkoxycarbonylalkyl,
$R_{27}$ is alkyl or monosubstituted alkyl wherein the substituent of monosubstituted alkyl is alkoxy, chloro, bromo or cyano,
X is —CO—, —CO$_2$— or —SO$_2$—, and
m is 2 or 3.
wherein each alkyl and alkoxy radical, including each alkyl and alkoxy radical or hydroxyalkyl, cyanoalkyl, formyloxyalkyl, alkylcarbonyloxyalkyl, alkoxycarbonyloxyalkyl, alkoxycarbonylalkyl and monosubstituted alkyl, independently has 1, 2, 3 or 4 carbon atoms and may be straight or branched.

Compounds of Formula VIII
wherein
$R_{21}$ is cyano or phenylsulfonyl,
$R_{25}$ is methyl, ethyl, β-formyloxyethyl, β-cyanoethyl, β-acetoxyethyl, β-methoxycarbonyloxyethyl, β-ethoxycarbonyloxyethyl, β-methoxycarbonylethyl or β-ethoxycarbonylethyl,
$R_{26}$ is ethyl, β-hydroxyethyl, β-formyloxyethyl, β-acetoxyethyl, β-methoxycarbonyloxyethyl, β-ethoxycarbonyloxyethyl, β-methoxycarbonylethyl or β-ethoxycarbonylethyl,
$R_{27}$ is methyl or ethyl,
m is 2, and
$R_2$, $R_{14}$ and X are as defined above are particularly preferred.

Also preferred are those compounds of Formula VIII wherein
$R_{25}$ is alkyl, cyanoalkyl, alkylcarbonyloxyalkyl, alkoxycarbonyloxyalkyl or alkoxycarbonylalkyl,
$R_{26}$ is alkyl, hydroxyalkyl, alkylcarbonyloxyalkyl, alkoxycarbonyloxyalkyl or alkoxycarbonylalkyl,
$R_{27}$ is alkyl or monosubstituted alkyl wherein the substituent is chloro, bromo or cyano, and
$R_2$, $R_{14}$, $R_{21}$, X and m are as defined following Formula VIII.

Also particularly preferred are those compounds of Formula VIII wherein
$R_{14}$ is hydrogen or ethoxy.
$R_{25}$ is ethyl, β-cyanoethyl or β-acetoxyethyl,
$R_{26}$ is ethyl or β-acetoxyethyl,
$R_{27}$ is methyl, ethyl or propyl,
X is —CO—,
m is 2, and
$R_2$ and $R_{21}$ are as defined following Formula VIII.

Also of interest are those compounds of Formula VIII wherein $R_{27}$ is alkoxyalkyl, and
$R_2$, $R_{14}$, $R_{21}$, $R_{25}$, $R_{26}$, X and m are as defined following Formula VIII, and of particular interest are those compounds of Formula VIII wherein
$R_{14}$ is hydrogen,
$R_{21}$ is cyano,
$R_{27}$ is β-alkoxyethyl,
X is —CO—,
m is 2, and
$R_2$, $R_{25}$ and $R_{26}$ are as defined following Formula VIII and particularly the compounds of this group wherein each of $R_{25}$ and $R_{26}$ is independently ethyl or β-acetoxyethyl.

Also of interest are the compounds of Formula VIII wherein at least one of $R_{25}$ and $R_{26}$ is formyloxyalkyl, and $R_2$, $R_{14}$, $R_{21}$, the other of $R_{25}$ and $R_{26}$ if both are not formyloxyalkyl, $R_{27}$, X and m are as defined
following Formula VIII and particularly those compounds of this group wherein $R_{25}$ and $R_{26}$ are β-formyloxyethyl.

Compounds of Formula VIII wherein $R_{27}$ is chloroalkyl, bromoalkyl or cyanoalkyl, and $R_2$, $R_{14}$, $R_{21}$, $R_{25}$, $R_{26}$, X and m are as defined
following Formula VIII are also of interest.

Also particularly preferred are compounds of the formula

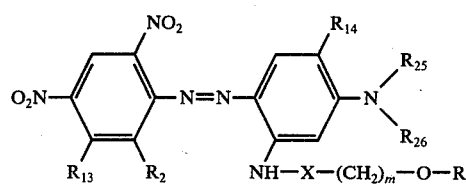

wherein
$R_2$ is hydrogen, chloro or bromo,
$R_{13}$ is hydrogen, formamido, acetamido, propionamido, chloropropionamido or bromopropionamido, with the proviso that at least one of $R_2$ and $R_{13}$ is hydrogen,
$R_{14}$ is hydrogen, methoxy or ethoxy,
$R_{25}$ is alkyl, cyanoalkyl, formyloxyalkyl, alkylcarbonyloxyalkyl, alkoxycarbonyloxyalkyl or alkoxycarbonylalkyl,
$R_{26}$ is alkyl, hydroxyalkyl, formyloxyalkyl, alkylcarbonyloxyalkyl, alkoxycarbonyloxyalkyl or alkoxycarbonylalkyl,
$R_{27}$ is alkyl or monosubstituted alkyl wherein the substituent of monosubstituted alkyl is alkoxy, chloro, bromo or cyano,
X is —CO—, —CO$_2$— or —SO$_2$—, and
m is 2 or 3,
wherein each alkyl and alkoxy radical, including each alkyl and alkoxy radical of hydroxyalkyl, cyanoalkyl, formyloxyalkyl, alkylcarbonyloxyalkyl, alkoxycarbonyloxyalkyl, alkoxycarbonylalkyl and monosubstituted alkyl, independently has 1, 2, 3, or 4 carbon atoms and may be straight or branched.

Compounds of Formula IX
wherein
$R_{13}$ is hydrogen or acetamido, with the proviso that at least one of $R_2$ and $R_{13}$ is hydrogen,
$R_{25}$ is methyl, ethyl, β-cyanoethyl, β-formyloxyethyl, β-acetoxyethyl, β-methoxycarbonylethyl, β-ethoxycarbonylethyl, β-methoxycarbonyloxyethyl or β-ethoxycarbonyloxyethyl,
$R_{26}$ is ethyl, β-hydroxyethyl, β-formyloxyethyl, β-acetoxyethyl, β-methoxycarbonyloxyethyl, β-ethoxycarbonyloxyethyl, β-methoxycarbonylethyl or β-ethoxycarbonylethyl,
$R_{27}$ is methyl, ethyl or propyl, m is 2, and $R_2$, $R_{14}$ and X are as defined above are particularly preferred.

Also preferred are the compounds of Formula IX wherein $R_{13}$ is hydrogen, acetamido, chloropropionamido or bromopropionamido, with the proviso that at least one of $R_2$ and $R_{13}$ is hydrogen, $R_{25}$ is alkyl, cyanoalkyl, alkylcarbonyloxyalkyl, alkoxycarbonyloxyalkyl or alkoxycarbonylalkyl, $R_{26}$ is alkyl, hydroxyalkyl, alkylcarbonyloxyalkyl, alkoxycarbonyloxyalkyl or alkoxycarbonylalkyl, $R_{27}$ is alkyl or monosubstituted alkyl wherein the substituent is chloro, bromo or cyano, and $R_2$, $R_{14}$, X and m are as defined following Formula IX are particularly preferred.

Also particularly preferred are those compounds of Formula IX wherein $R_{13}$ is hydrogen, acetamido, chloropropionamido or bromoprepionamido, with the proviso that at least one of $R_2$ and $R_{13}$ is hydrogen, $R_{25}$ is ethyl, butyl, $\beta$-cyanoethyl, $\beta$-propionyloxyethyl, $\beta$-methoxycarbonylethyl, $\beta$-ethoxycarbonylethyl or $\beta$-ethoxycarbonyloxyethyl, $R_{26}$ is methyl, ethyl, propyl, $\beta$-hydroxyethyl, $\beta$-propionyloxyethyl, $\beta$-ethoxycarbonylethyl, $\beta$-methoxycarbonyloxyethyl or $\beta$-ethoxycarbonyloxyethyl, $R_{27}$ is methyl or ethyl, and $R_2$, $R_{14}$, X and m are as defined following Formula IX.

Also of interest are those compounds of Formula IX wherein $R_{27}$ is alkoxyalkyl, and $R_2$, $R_{13}$, $R_{14}$, $R_{25}$, $R_{26}$, X and m are as defined following Formula IX. and of particular interest are those compounds of Formula IX wherein $R_{13}$ is hydrogen, $R_{14}$ is ethoxy, $R_{25}$ is ethyl or $\beta$-acetoxyethyl, $R_{26}$ is ethyl or $\beta$-acetoxyethyl, $R_{27}$ is $\beta$-alkoxyethyl, X is —CO— or —CO$_2$—, m is 2, and $R_2$ is as defined following Formula IX.

Also of interest are the compounds of Formula IX wherein at least one of $R_{25}$ and $R_{26}$ is formyloxyalkyl, and $R_2$, $R_{13}$, $R_{14}$, the other of $R_{25}$ and $R_{26}$ if both aren't formyloxyalkyl, $R_{27}$, X and m are as defined following Formula IX and particularly those compounds of this group wherein $R_{25}$ and $R_{26}$ are $\beta$-formyloxyethyl as well as compounds of Formula IX wherein $R_{27}$ is chloroalkyl, bromoalkyl or cyanoalkyl, and $R_2$, $R_{13}$, $R_{14}$, $R_{25}$, $R_{26}$, X and m are as defined following Formula IX. The new compounds of formula I are worked up as dyeing preparations by known methods, for example by grinding in the presence of dispersing agents and/or fillers. The ground mixtures are vacuum or injection dried if dry preparations are desired. The preparations are added to a suitable volume of water for exhaust dyeing, pad dyeing and printing at long or short liquor ratio.

From aqueous dispersion the dyes build up powerfully on synthetic and regenerated organic fibres, both in the loose form and as yarn or textiles. They are especially suitable for dyeing and printing polyester, cellulose acetate, cellulose triacetate and polyamide fibres and textiles, and can also be applied to polyolefin fibres. The known dyeing and printing methods are used, for instance the process described in French Pat. No. 1,445,371.

The dyeings obtained have good fastness in a comprehensive range of properties, the fastness to light and to thermofixation, sublimation and pleating being notably good. They are very fast to wet treatments such as washing, water, sea water, perspiration, solvents, especially dry cleaning liquor, lubricants, and to rubbing, cross dyeing, ozone, gas fumes and chlorine. The dyeings are stable to precure and post-cure permanent press finishing and to soil release finishes. They show good stability to reducing action in the dyeing of textiles containing wool and reserve wool and cotton. The dyeings are dischargeable.

This invention therefore serves the purpose, inter alia, of supplying the textile industry with new, superior dyes for dyeing the synthetic fibre and regenerated fibre textiles which are being produced on an ever growing scale, and with which a prime consideration is to have dyes which are applicable by the rationalized continuous and high-temperature dyeing processes in use today.

In the following Examples the parts are by weight and the temperatures in degrees centigrade.

EXAMPLE 1

At a temperature near to 70° 7 parts of sodium nitrite are added to 155 parts of concentrated sulfuric acid, followed at 15° by 26.2 parts 2-bromo-4,6-dinitroaminobenzene. The solution is stirred for 2 hours at 15°–20° and the diazonium salt solution thus formed is cooled to about 0° and, at this temperature, combined with a solution of 5 parts of urea and 29.4 parts 1-methoxypropionylamino-3-N,N-diethylamino-4-ethoxybenzene in 100 parts of glacial acetic acid. The coupling reaction is brought to a close by addition of concentrated sodium acetate solution until the pH of the reaction mixture is about 4. The dye settles out and is filtered, washed with water until free of acid, and dried.

Applied to polyester fibres or textiles, the thus obtained dye of the formula

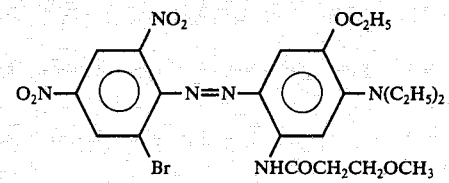

gives brilliant greenish blue shades of great depth which have very good fastness properties.

EXAMPLE 2

At a temperature not higher than 70° 7 parts of sodium nitrite are added to 155 parts of concentrated sulphuric acid, followed at 15° by 24.2 parts of 2-amino-3-bromo-5-nitrobenzonitrile. The solution is stirred for 2 hours at 15°–20° and the diazonium salt solution thus formed is combined with a solution of 2 parts of urea and 25 parts of 1-N,N-diethylamino-3-(3'-methoxypropionyl)-anilide in 100 parts of glacial acetic acid. After the addition of 500 parts of ice-water the reaction solution is stirred for a further 2 hours, on which the dye settles out. It is filtered, washed with water until free of acid, and dried.

Applied to polyester fibres or textiles, this dye gives brilliant blue shades of great depth which have very good fastness properties.

Further dyes of Formula I which can be produced by analogy with the foregoing Examples are specified in the table below.

TABLE

| Ex. No. | R₁ | R₂ | R₃ | R₄ | R₅ | R₆ | R₇ | n | X | Shade on polyester fiber |
|---|---|---|---|---|---|---|---|---|---|---|
| 3 | —Cl | H | H | H | —CH₂CH₂OCOCH₃ | —CH₂CH₂OCOCH₃ | —CH₃ | 2 | —CO— | blue |
| 4 | —CN | H | H | H | " | " | —C₂H₅ | 2 | " | " |
| 5 | —CN | H | H | H | —CH₂CH₂CN | " | —CH₃ | 2 | " | rubine |
| 6 | —CN | H | H | H | —C₂H₅ | " | " | 2 | " | red |
| 7 | —SO₂CH₃ | H | H | —OC₂H₅ | —CH₂CH₂CN | —CH₂CH₂CN | " | 3 | " | violet |
| 8 | —NO₂ | Br | H | —OC₂H₅ | —CH₂CH₂OCOC₂H₅ | —CH₂CH₂OCOC₂H₅ | " | 2 | " | blue |
| 9 | " | " | " | " | —CH₂CH₂OH | —CH₂CH₂OH | " | 2 | " | " |
| 10 | " | Cl | Cl | " | —CH₂CH₂CN | —CH₂CH₂CN | " | 2 | " | reddish blue |
| 11 | " | " | " | " | —C₂H₅ | —C₂H₅ | " | 2 | " | blue |
| 12 | " | " | H | " | " | " | " | 2 | " | " |
| 13 | " | " | " | " | " | " | " | 2 | " | reddish blue |
| 14 | " | H | H | H | —C₂H₅ | —C₂H₅ | —CH(CH₃)₂ | 2 | —CO— | " |
| 15 | " | Cl | H | —OCH₃ | —CH₂CH₂OCOCH₃ | —CH₂CH₂OCOCH₃ | —CH₃ | 2 | —COO— | " |
| 16 | H₅C₆—SO₂— | Cl | —NHCOCH₃ | H | " | " | —CH(CH₃)₂ | 2 | —SO₂— | " |
| 17 | (4-CH₃-C₆H₄-SO₂—) | Cl | —NHCOCH₂CH₂Br | —OCH₃ | —CH₂CH₂CN | —CH₂CH₂CN | —CH(CH₃)₂ | 2 | —CO— | blue |
| 18 | —NO₂ | H | H | H | " | " | —C₂H₅ | 2 | " | reddish blue |
| 19 | " | Br | H | " | —OC₂H₅ | " | " | 2 | " | " |
| 20 | " | Cl | H | —OC₂H₅ | " | —CH₂CH₂COOC₂H₅ | " | 2 | " | " |
| 21 | " | " | H | " | —OC₂H₅ | —CH₂CH₂OCH₃ | " | 2 | " | reddish blue |
| 22 | —NO₂ | Br | H | H | " | —CH₃ | —CH₃ | 2 | " | reddish blue |
| 23 | " | Cl | H | " | " | —C₂H₅ | —C₂H₅ | 2 | " | |
| 24 | " | Br | H | " | —CH₂CH₂OCOCH₃ | —CH₂CH₂OCOCH₃ | —CH₂CH₂CH₃ | 2 | " | |
| 25 | " | " | H | " | —CH₂CH₂OC₂H₅ | —CH₂CH₂OC₂H₅ | —CH₃ | 2 | " | |
| 26 | —NO₂ | Br | H | H | —CH₂CH₂OCOOC₂H₅ | —CH₂CH₂OCOOC₂H₅ | —CH₃ | 2 | " | |
| 27 | " | " | H | " | —CH₂CH₂CN | —CH₂CH₂CN | —CH₃ | 2 | " | |
| 28 | " | " | H | " | —C₂H₅ | —C₂H₅ | " | 2 | " | |
| 29 | " | " | H | " | —CH₂CH₂OCOC₆H₅ | —CH₂CH₂OCOC₆H₅ | " | 2 | " | |
| 30 | " | Cl | H | " | " | " | " | 2 | " | |
| 31 | H₃C—SO₂— | Br | H | " | —CH₂CH₂OCOCH₃ | —CH₂CH₂OCOCH₃ | —CH(CH₃)₂ | 2 | " | |
| 32 | —CN | " | H | " | " | " | " | 2 | " | |
| 33 | " | " | H | " | —CH₂CH₂OCOC₂H₅ | —CH₂CH₂OCOC₂H₅ | " | 2 | " | |
| 34 | " | Cl | H | " | " | " | " | 2 | " | |
| 35 | " | " | H | " | —CH₂CH₂OCHO | —CH₂CH₂OCHO | " | 2 | " | |
| 36 | " | Br | H | " | —CH₂CH₂OH | —CH₂CH₂OH | " | 2 | " | |
| 37 | " | " | H | " | —CH₂CH₂COOC₂H₅ | —CH₂CH₂COOC₂H₅ | " | 2 | " | |
| 38 | " | " | H | " | " | " | " | 2 | " | |
| 39 | " | " | H | " | " | " | " | 2 | " | |
| 40 | —CN | " | H | " | " | " | " | 2 | " | |
| 41 | " | Br | H | " | —CH₂CH₂OCOCH₃ | —CH₂CH₂OCOCH₃ | —CH₃ | 2 | —CO— | bluish red |
| 42 | " | " | H | " | " | " | —C₂H₅ | 2 | " | blue |
| 43 | " | " | H | " | " | " | —CH₃ | 2 | " | bluish red |
| 44 | " | " | H | " | " | " | —C₂H₅ | 2 | " | |
| 45 | " | " | H | " | " | " | " | 2 | " | |
| 46 | " | " | H | " | " | " | " | 2 | " | |
| 47 | " | " | H | " | " | " | " | 2 | " | |
| 48 | " | " | H | " | " | " | " | 2 | " | |
| 49 | " | " | H | " | " | " | " | 2 | " | |
| 50 | " | " | H | " | —CH₂CH₂COOC₂H₅ | —CH₂CH₂COOC₂H₅ | " | 2 | " | |
| 51 | —CN | Cl | H | H | —C₂H₅ | —CH₂CH₂CH₃ | " | 2 | —CO— | blue |
| 52 | " | " | H | " | " | " | " | 2 | " | " |

TABLE-continued

| Ex. No. | R₁ | R₂ | R₃ | R₄ | R₅ | R₆ | R₇ | n | X | Shade on polyester fiber |
|---|---|---|---|---|---|---|---|---|---|---|
| 53 | " | Cl | H | H | | | —CH₂CH₂CH₂CH₃ | 2 | —COO— | reddish blue |
| 54 | " | Br | H | H | | | —C₂H₅ | 2 | " | " |
| 55 | " | Cl | H | H | | | —CH₃ | 2 | " | " |
| 56 | " | Br | H | —OC₂H₅ | —CH₂CH₂COOC₂H₅ | —CH₂CH₂COOCH₂CH₂CH₃ | —CH₃ | 2 | " | violet |
| 57 | " | Cl | H | H | —CH₂CH₃ | | —CH₂CH₂CN | 2 | " | " |
| 58 | " | Br | H | H | | —C₂H₅ | —CH₃ | 2 | " | " |
| 59 | " | H | H | H | —CH₃ | —CH₃ | —CH₂CH₂Br | 2 | " | blue |
| 60 | " | Br | H | H | —C₂H₅ | —C₂H₅ | —CH₃ | 2 | " | " |
| 61 | —CN | H | H | H | —CH₃ | —CH₃ | —C₂H₅ | 2 | " | " |
| 62 | " | Br | H | —OC₂H₅ | | | —CH₂CH₂OCH₃ | 2 | " | " |
| 63 | " | Br | H | H | —CH₂CH₃ | —CH₃ | —CH₂CH₂OCH₃ | 2 | —CO— | blue |
| 64 | " | Cl | H | H | | | —CH₃ | 3 | " | " |
| 65 | " | Br | H | H | —OC₂H₅ | —CH₂CH₂OCOC₂H₅ | —CH₃ | 2 | " | " |
| 66 | —NO₂ | Cl | H | H | —CH₂CH₂COOC₂H₅ | —CH₂CH₂COOC₂H₅ | —CH(CH₃)₂ | 2 | " | " |
| 67 | " | Br | H | H | —CH₂COOC₂H₅ | —CH₂COOC₂H₅ | —CH₂CH₂OC₂H₅ | 2 | " | " |
| 68 | —NO₂ | Br | H | —OC₂H₅ | —CH₂COOCH₃ | —CH₃ | —CH₃ | 2 | —COO— | greenish blue violet |
| 69 | " | Br | H | H | —CH₂COOC₂H₅ | —CH₂COOCH₂CH₃ | —CH₂CH₂OC₂H₅ | 2 | " | violet |
| 70 | " | Br | H | H | —C₂H₅ | —CH₂CH₂OH | —C₂H₅ | 2 | " | greenish blue |
| 71 | " | Br | H | H | | —C₂H₅ | —CH(CH₃)₂ | 2 | " | " |
| 72 | " | Br | H | H | | —CH₃ | —C₂H₅ | 2 | " | " |
| 73 | —NO₂ | Cl | H | H | | —CH₃ | CH₃—CH₂ | 2 | " | reddish blue |
| 74 | " | Br | H | H | —CH₂CH₂COOC₂H₅ | —CH₂COOCH₂CH₂ | —CH₃ | 3 | " | reddish blue |
| 75 | " | Br | H | H | —OC₂H₅ | —CH₂CH₂OCOC₂H₅ | —CH₂CH₂OCH(CH₃)₂ | 2 | " | greenish blue |
| 76 | " | Br | H | H | —CH₂CH₂COOC₂H₅ | —CH₂CH₂COOC₂H₅ | —CH₂CH₂OC₂H₅ | 2 | " | " |
| 77 | " | Br | H | H | —CH₂CH₂OCOCH₃ | —CH₂CH₂OCOCH₃ | —CH₃ | 2 | " | " |
| 78 | " | Br | H | H | —CH₃ | —CH₂CH₂CH₂CH₃ | —CH₂CH₂OCH₃ | 2 | " | " |
| 79 | " | Br | H | H | —CH₂CH₂OCHO | " | —CH₃ | 2 | —CO— | blue |
| 80 | " | Br | H | H | —C₂H₅ | " | " | 2 | " | " |
| 81 | " | Br | H | H | —CH₂CH₂OCOC₂H₅ | —CH₂CH₂OCOC₂H₅ | —CH₂CH₂CH₃ | 2 | —SO₂— | " |
| 82 | " | Br | H | H | —C₂H₅ | " | " | 2 | —COO— | " |
| 83 | —NO₂ | Cl | H | —OC₂H₅ | | | —CH₃ | 2 | —CO— | reddish blue |
| 84 | " | Cl | H | " | | | " | 2 | " | " |
| 85 | " | Cl | H | " | | | " | 2 | " | " |
| 86 | " | Br | H | " | | —C₂H₅ | —CH₂CH₂CN | 2 | " | blue |
| 87 | " | Br | H | " | | " | —CH₂CH₂Cl | 2 | " | " |
| 88 | " | Br | H | " | | " | —CH₂CH₂Br | 2 | " | " |
| 89 | " | Br | H | " | | " | —CH₂CH₂OCH₃ | 2 | —COO— | greenish blue |
| 90 | " | Br | H | " | | —CH₂CH₂OCOCH₃ | —CH₂CH₂OCH₃ | 2 | " | greenish blue |
| 91 | " | Br | H | " | | —CH₂CH₂OCOCH₃ | —CH₂CH₂OCH₃ | 2 | " | reddish blue |
| 92 | " | Br | H | " | | " | —CH₂CH₂OCH₃ | 2 | " | reddish blue |
| 93 | " | Cl | H | " | | —C₂H₅ | —CH₂CH₂OCH₃ | 2 | " | " |
| 94 | " | Br | H | " | | —C₂H₅ | —C₂H₅ | 2 | " | blue |

APPLICATION EXAMPLE

A mixture of 7 parts of the dye produced as in the foregoing Example 2, 4 parts of sodium dinaphthylmethane disulphonate, 4 parts of sodium cetyl sulphate and 5 parts of anhydrous sodium sulphate is ground in a ball mill for 48 hours to give a fine powder. One part of the powder is dispersed in a little water and the dispersion run through a sieve into a bath of 4000 parts of water containing 2 parts of sodium lauryl sulphate.

100 Parts of a scoured polyester fabric are entered into this dyebath (goods to liquor ratio 1:40) at 40°–50°, after which 20 parts of an emulsion of a chlorinated benzene in water are added. The bath is raised slowly to 100° and the fabric dyed for 1–2 hours at 95°–100°. On removal it is rinsed, soaped, rinsed and dried. A level blue dyeing of good depth is obtained which is outstandingly fast to light, washing, water, sea water, perspiration, sublimation, gas fumes, thermofixation, pleating, cross dyeing and permanent press finishing. Formulae of representative dyestuffs of the foregoing Examples are as follows:

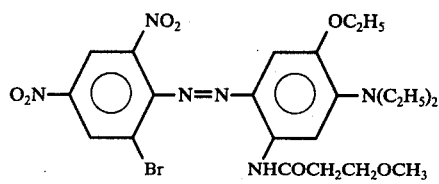

Example 1,

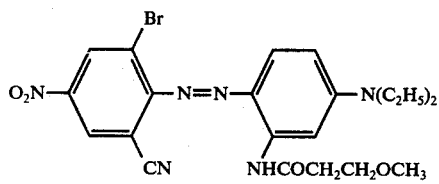

Example 2,

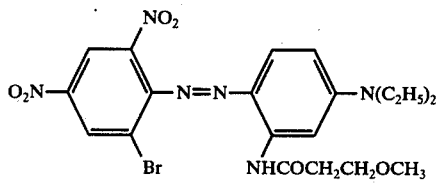

Example 7,

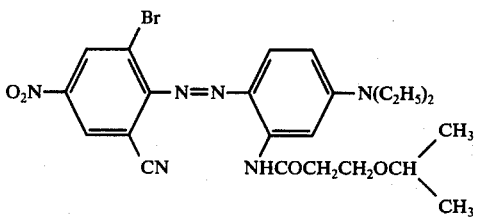

Example 15,

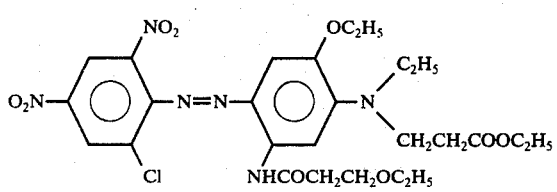

Example 24,

-continued

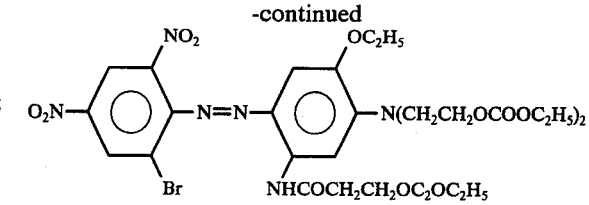

Example 29,

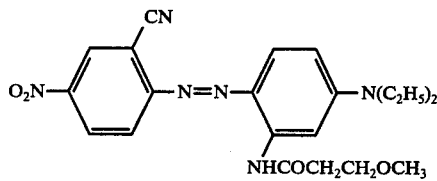

Example 31

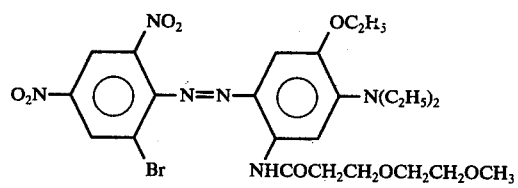

Example 69,

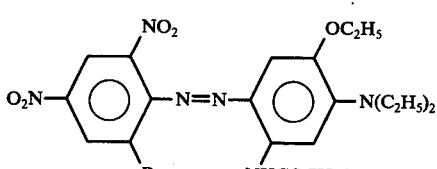

Example 70,

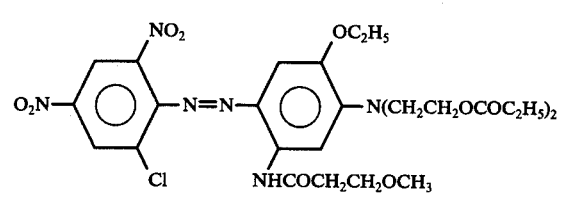

Example 84,

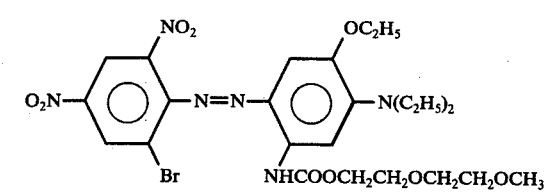

Example 89 and

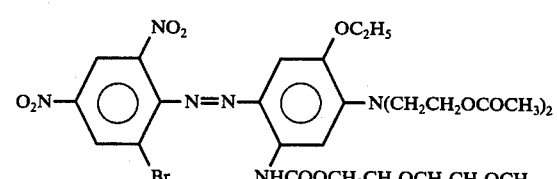

Example 92.

What I claim is:
1. A compound of the formula

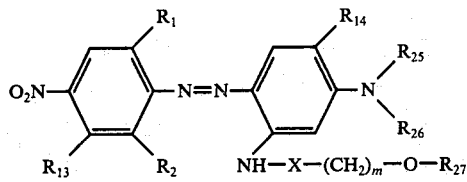

wherein
- $R_1$ is nitro, cyano, phenylsulfonyl or tolylsulfonyl,
- $R_2$ is hydrogen, chloro or bromo,
- $R_{13}$ is hydrogen, formamido, acetamido, propionamido, chloropropionamido or bromopropionamido, with the proviso that at least one of $R_2$ and $R_{13}$ is hydrogen,
- $R_{14}$ is hydrogen, methoxy or ethoxy,
- $R_{25}$ is alkyl, cyanoalkyl, formyloxyalkyl, alkylcarbonyloxyalkyl, alkoxycarbonyloxyalkyl or alkoxycarbonylalkyl,
- $R_{26}$ is alkyl, hydroxyalkyl, formyloxyalkyl, alkylcarbonyloxyalkyl, alkoxycarbonyloxyalkyl or alkoxycarbonylalkyl,
- $R_{27}$ is alkoxyalkyl,
- X is —CO—, —CO$_2$— or —SO$_2$—, and
- m is 2 or 3, wherein each alkyl, hydroxyalkyl and alkyl and alkoxy radical of each cyanoalkyl, formyloxyalkyl, alkylcarbonyloxyalkyl, alkoxycarbonyloxyalkyl, alkoxycarbonylalkyl and alkoxyalkyl independently has 1 to 4 carbon atoms 2. A compound according to claim 1 having the formula

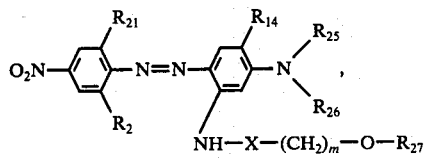

wherein
- $R_2$ is hydrogen, chloro or bromo,
- $R_{14}$ is hydrogen, methoxy or ethoxy,
- $R_{21}$ is cyano, phenylsulfonyl or tolylsulfonyl,
- $R_{25}$ is alkyl, cyanoalkyl, formyloxyalkyl, alkylcarbonyloxyalkyl, alkoxycarbonyloxyalkyl or alkoxycarbonylalkyl,
- $R_{26}$ is alkyl, hydroxyalkyl, formyloxyalkyl, alkylcarbonyloxyalkyl, alkoxycarbonyloxyalkyl or alkoxycarbonylalkyl,
- $R_{27}$ is alkoxyalkyl,
- X is —CO—, —CO$_2$— or —SO$_2$—, and
- m is 2 or 3, wherein each alkyl, hydroxyalkyl and alkyl and alkoxy radical of each cyanoalkyl, formyloxyalkyl, alkylcarbonyloxyalkyl, alkoxycarbonyloxyalkyl, alkoxycarbonylalkyl and alkoxyalkyl independently has 1 to 4 carbon atoms.

3. A compound according to claim 2 wherein $R_{27}$ is β-alkoxyethyl.

4. A compound according to claim 3 wherein
- $R_{14}$ is hydrogen,
- $R_{21}$ is cyano,
- X is —CO—, and
- m is 2.

5. A compound according to claim 1 having the formula

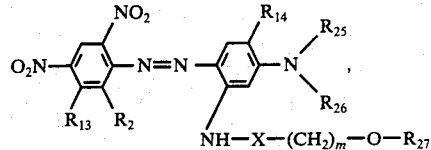

wherein
- $R_2$ is hydrogen, chloro or bromo,
- $R_{13}$ is hydrogen, formamido, acetamido, propionamido, chloropropionamido or bromopropionamido, with the proviso that at least one of $R_2$ and $R_{13}$ is hydrogen
- $R_{14}$ is hydrogen, methoxy or ethoxy,
- $R_{25}$ is alkyl, cyanoalkyl, formyloxyalkyl, alkylcarbonyloxyalkyl, alkoxycarbonyloxyalkyl or alkoxycarbonylalkyl,
- $R_{26}$ is alkyl, hydroxyalkyl, formyloxyalkyl, alkylcarbonyloxyalkyl, alkoxycarbonyloxyalkyl or alkoxycarbonylalkyl,
- $R_{27}$ is alkoxyalkyl,
- X is —CO—, —CO$_2$— or —SO$_2$—, and
- m is 2 or 3, wherein each alkyl, hydroxyalkyl and alkyl and alkoxy radical of each cyanoalkyl, formyloxyalkyl, alkylcarbonyloxyalkyl, alkoxycarbonyloxyalkyl, alkoxycarbonylalkyl and alkoxyalkyl independently has 1 to 4 carbon atoms.

6. A compound according to claim 5 wherein $R_{27}$ is β-alkoxyethyl.

7. A compound according to claim 6 wherein
- $R_{13}$ is hydrogen,
- $R_{14}$ is ethoxy,
- $R_{25}$ is ethyl or β-acetoxyethyl,
- $R_{26}$ is ethyl or β-acetoxyethyl,
- X is —CO— or —CO$_2$—, and
- m is 2, 8. The compound according to claim 7 having the formula

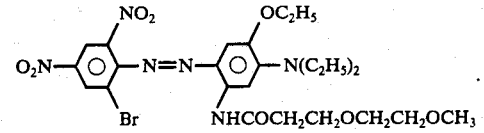

9. The compound according to claim 7 having the formula

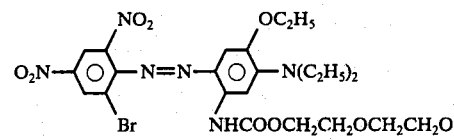

10. The compound according to claim 7 having the formula

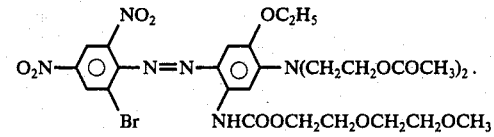

11. The compound according to claim 7 having the formula

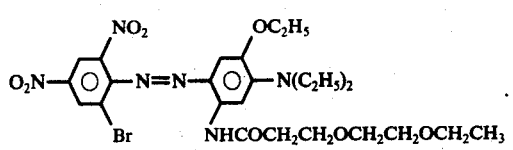

12. The compound according to claim 7 having the formula

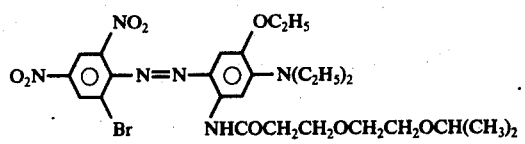

13. The compound according to claim 7 having the formula

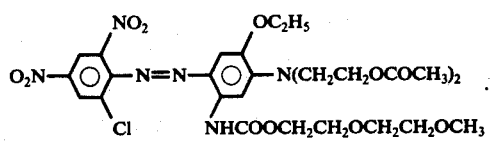

14. The compound according to claim 3 having the formula

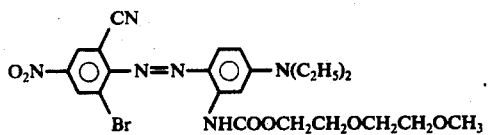

15. The compound according to claim 3 having the formula

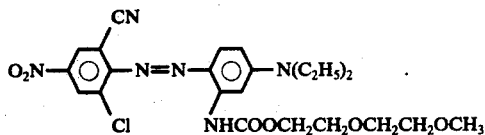

16. The compound according to claim 3 having the formula

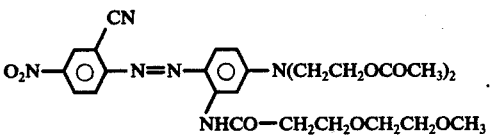

17. The compound according to claim 3 having the formula

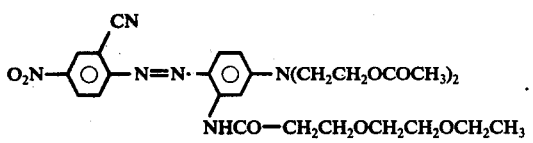

18. The compound according to claim 3 having the formula

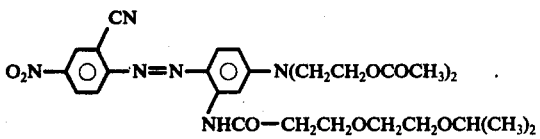

19. The compound according to claim 3 having the formula

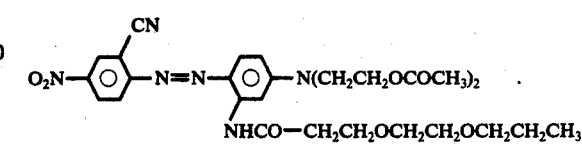

* * * * *